United States Patent
Ribeiro Miranda et al.

(10) Patent No.: US 10,124,849 B2
(45) Date of Patent: Nov. 13, 2018

(54) SPROCKET COVER

(71) Applicant: Miranda & Irmao, Lda., Agueda (PT)

(72) Inventors: Joao Carlos Ribeiro Miranda, Recardaes (PT); Joao Carlos Nunes Lourenco, Branca ALB (PT)

(73) Assignee: MIRANDA & IRMAO, LDA., Agueda (PT)

(*) Notice: Subject to any disclaimer, the term of this patent is extended or adjusted under 35 U.S.C. 154(b) by 0 days.

(21) Appl. No.: 14/762,285

(22) PCT Filed: Feb. 26, 2014

(86) PCT No.: PCT/PT2014/000015
§ 371 (c)(1),
(2) Date: Jul. 21, 2015

(87) PCT Pub. No.: WO2014/133404
PCT Pub. Date: Sep. 4, 2014

(65) Prior Publication Data
US 2015/0353155 A1  Dec. 10, 2015

(30) Foreign Application Priority Data

Feb. 27, 2013 (PT) ........................................ 106810
Feb. 20, 2014 (DE) ........................ 10 2014 002 433

(51) Int. Cl.
*B62J 13/00* (2006.01)
*F16D 1/00* (2006.01)
*F16H 57/02* (2012.01)
*B62M 3/16* (2006.01)

(52) U.S. Cl.
CPC ................ *B62J 13/00* (2013.01); *B62M 3/16* (2013.01)

(58) Field of Classification Search
CPC ....... B62J 13/00; B62J 23/00; Y10T 74/2165; Y10T 74/2191; B62M 9/105
USPC ........................................................... 474/144
See application file for complete search history.

(56) References Cited

U.S. PATENT DOCUMENTS

| | | | |
|---|---|---|---|
| 504,121 A * | 8/1893 | Cheesman | F16H 7/18 474/144 |
| 1,136,411 A * | 4/1915 | Davis | B62J 21/00 74/609 |
| 3,477,303 A * | 11/1969 | Brilando | B62M 9/10 474/144 |
| 3,550,465 A * | 12/1970 | Maeda | B62M 9/105 474/151 |

(Continued)

FOREIGN PATENT DOCUMENTS

DE  202004006878 U1  7/2004
DE  202004006978 U1  7/2004

(Continued)

OTHER PUBLICATIONS

International Search Report dated Apr. 25, 2014 for Application No. PCT/PT2014/000015.

(Continued)

*Primary Examiner* — Henry Y Liu
(74) *Attorney, Agent, or Firm* — Lucas & Mercanti, LLP

(57) ABSTRACT

A cover for the sprocket (5) of a bicycle or electric bicycle consists of a cover plate (9) which is arranged between the chain wheel (5) and the equilateral crank (2) and fastened without screws on the inside of the crank.

6 Claims, 6 Drawing Sheets

(56) References Cited

U.S. PATENT DOCUMENTS

Figure 1:
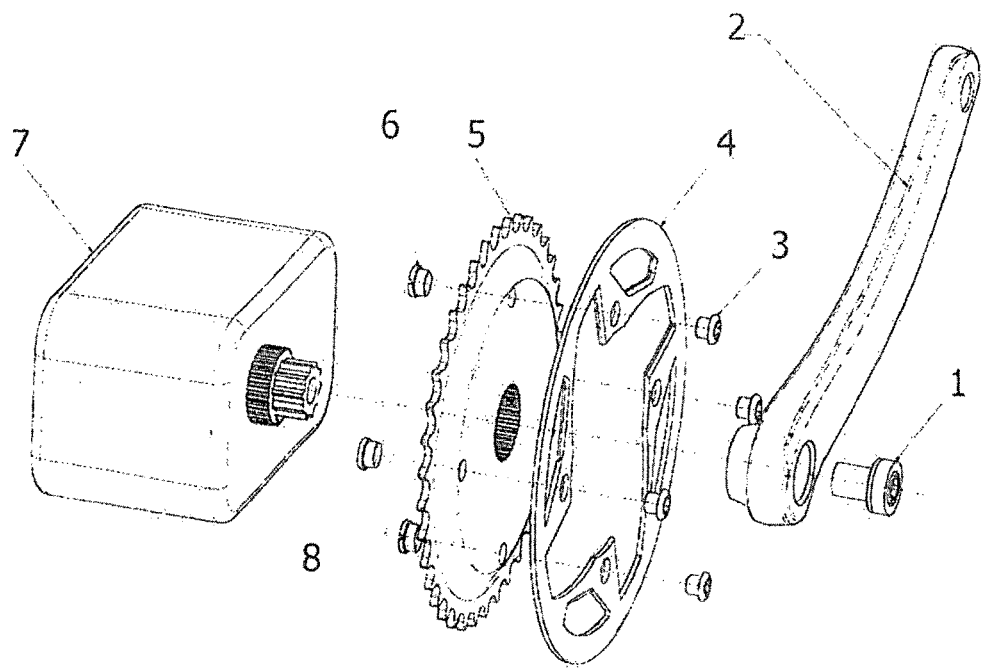

| | | | | |
|---|---|---|---|---|
| 3,815,439 A * | 6/1974 | Tarutani | ............... | F16P 1/04 |
| | | | | 474/144 |
| 3,835,729 A * | 9/1974 | Tarutani | ............... | B62M 9/105 |
| | | | | 474/144 |
| 4,044,621 A * | 8/1977 | McGregor, Sr. | ......... | B62J 13/00 |
| | | | | 474/144 |
| 4,418,584 A * | 12/1983 | Shimano | ............... | B62K 19/34 |
| | | | | 74/594.2 |
| 4,439,172 A * | 3/1984 | Segawa | ............... | B62M 9/105 |
| | | | | 474/144 |
| 4,453,924 A | 6/1984 | Sugino | | |
| 4,475,894 A * | 10/1984 | Sugino | ............... | B62M 9/105 |
| | | | | 474/144 |
| 4,487,424 A * | 12/1984 | Ellis | ............... | B62J 13/00 |
| | | | | 280/304.3 |
| 4,594,910 A * | 6/1986 | Nagano | ............... | B62M 9/105 |
| | | | | 74/594.1 |
| 5,003,840 A * | 4/1991 | Hinschlager | ............ | B62J 23/00 |
| | | | | 280/152.1 |
| 5,320,583 A * | 6/1994 | van Wingen born Looyen | ......... | |
| | | | | B62J 13/00 |
| | | | | 474/144 |
| 5,460,576 A * | 10/1995 | Barnett | ............... | B62J 13/00 |
| | | | | 474/140 |
| 5,941,333 A | 8/1999 | Sun et al. | | |
| 6,012,538 A * | 1/2000 | Sonobe | ............... | B62M 6/45 |
| | | | | 180/206.3 |
| 6,354,973 B1 * | 3/2002 | Barnett | ............... | B62J 13/00 |
| | | | | 474/101 |
| 6,443,865 B1 * | 9/2002 | Yamanaka | ............. | B62J 13/00 |
| | | | | 474/144 |
| 6,450,909 B1 * | 9/2002 | Yamanaka | ............. | B62J 13/00 |
| | | | | 474/144 |
| 6,475,110 B1 * | 11/2002 | Yamanaka | ............. | B62J 13/00 |
| | | | | 474/144 |
| 6,533,690 B2 * | 3/2003 | Barnett | ............... | B62J 13/00 |
| | | | | 474/116 |
| 7,066,856 B1 * | 6/2006 | Rogers | ............... | B62J 23/00 |
| | | | | 474/144 |
| 7,753,815 B2 * | 7/2010 | Saifuddin | ............ | B62M 9/105 |
| | | | | 474/140 |
| RE42,436 E * | 6/2011 | Rogers | ............... | B62J 23/00 |
| | | | | 474/144 |
| 8,029,397 B2 * | 10/2011 | Chuang | ............... | B62J 13/02 |
| | | | | 474/144 |
| RE44,379 E * | 7/2013 | Rogers | ............... | B62J 23/00 |
| | | | | 280/304.3 |
| 8,491,429 B2 * | 7/2013 | Cranston | ............. | B62J 13/00 |
| | | | | 280/304.3 |
| 2002/0160869 A1 * | 10/2002 | Barnett | ............... | B62J 13/00 |
| | | | | 474/144 |
| 2003/0224891 A1 * | 12/2003 | Chou | ............... | B62J 13/00 |
| | | | | 474/146 |
| 2006/0199690 A1 * | 9/2006 | Gardner | ............. | B62J 13/00 |
| | | | | 474/144 |
| 2008/0176691 A1 * | 7/2008 | Saifuddin | ............ | B62M 9/105 |
| | | | | 474/160 |
| 2008/0293528 A1 * | 11/2008 | Paull | ............... | B62J 13/00 |
| | | | | 474/144 |

FOREIGN PATENT DOCUMENTS

| | | |
|---|---|---|
| EP | 2562071 A1 | 2/2013 |
| JP | S4030102 Y1 | 10/1965 |
| JP | S6231586 U | 2/1987 |
| JP | H0660591 U | 8/1994 |
| JP | H11105761 A | 4/1999 |
| JP | 2001253378 A | 9/2001 |

OTHER PUBLICATIONS

Writ of Opposition dated Mar. 14, 2017 for corresponding Application No. DE 102014002433.

Wikipedia entry on Pedelec with English translation filed in corresponding German Application No. 10 2014 002 433.4.

Letter to German PTO and correspondence from German PTO.

Extract from the German Patent Register for German Application No. 10 2014 002 433.4.

Photographs of the Motobecane crank set attached to the Writ of Opposition dated Mar. 14, 2017 for corresponding Application No. DE 102014002433 (Writ of Opposition filed May 30, 2017).

* cited by examiner

SPROCKET COVER

CROSS REFERENCE TO RELATED APPLICATION

This Application is a 371 of PCT/PT2014/000015 filed on Feb. 26, 2014 which, in turn, claimed the priority of Portuguese Patent Application No. 106810 filed on Feb. 27, 2013 and German Patent Application No. 102014002433.4 filed on Feb. 20, 2014, all applications are incorporated herein by reference.

The invention relates to a cover for the sprocket of a bicycle with two cranks and a chain wheel cover plate which is located between the chain wheel and the equilateral crank and at least having a center opening.

STATE OF THE ART

Especially for the protection of the user's clothing conventional bicycles and bicycles with motorized support of the so called electric bicycles or pedelec have both, usually either a frame mounted cover for part of the chain and the sprocket or a chain cover plate, the diameter usually being somewhat larger than the diameter of the chain wheel (for one chain wheel set the chain wheel with the largest diameter). The cover may also be designed to protect from contamination at least a portion of the sprocket in chain engagement and/or to prevent the chain to jump out from the sprocket. The cover can be full area with a central opening for the passage of the Journal of bottom bracket or, e.g. have recesses for weight reduction.

From U.S. Pat. No. 5,320,583 A, a cover for a chain wheel is known with which the crank is rotatably connected. The cover plate sitting on the crank, has a channel-like recess for the latter and is attached by means of a central screw which is screwed into a threaded hole in the pedal crank or bottom bracket bearing shaft.

From DE 20 2004 006 878 U1 a similar construction is known in which the cover plate is fixed by a central threaded screw, and a clamping sleeve in the bottom bracket bearing shaft designed as a hollow shaft.

Both solutions are not suitable for bikes assisted by electric power, where there is no rotating rigid connection between the chain wheel and the equilateral crank (as well as the crank on the opposite side), depending on the driving condition.

Another known option that is particularly suitable for electric bicycles, is to connect the cover directly to the chain wheel using nuts and bolts.

These prior art designs require many manufacturing and assembly steps.

INVENTION

The invention has for its object to provide a chain wheel cover that requires fewer parts compared to prior art designs and requires less installation time.

This object is achieved with a cover of the aforementioned type according to the invention characterized in that the cover is screwless rotatably connected with the crank at the side facing the chain wheel.

This construction, in which bolts, nuts, threaded holes or special parts are not needed (as in the case of DE 20 2004 006 878 U1) is suitable for all types of bikes, i.e. especially for the so called electric bicycles. The cover plate can consist of metal or plastic.

Preferably, the crank at its designed for receiving the shaft journal of the bottom bracket end has the annular extension, with which the cover is inextricably connected, facing the chain wheel.

For this purpose the diameter of the central opening of the cover plate is adapted to the outer diameter of the annular extension of the pedal crank, so that the cover can be pressed on this annular extension. To this end, the ring shaped extension of the crank may have a conical outer contour.

The annular extension may have a diameter step as an attachment surface for the corresponding region of the cover plate.

As a screwless non-rotatable connection, depending on the particular materials, it is suitable, e.g. spot welding or gluing. Preferably, the cover with the crank is, however, non-rotatably connected by at least partially deforming the material of the pedal crank. Such pressing or crimping, made by means of an appropriate tool, is rapidly generate in a single operation.

Preferably, the cover is recessed in the area of its association with the crank in a plate like manner to keep small the distance or gap between the peripheral portion of the cover plate and the chain bearing area of the rear sprocket.

DRAWINGS

Figure 2:
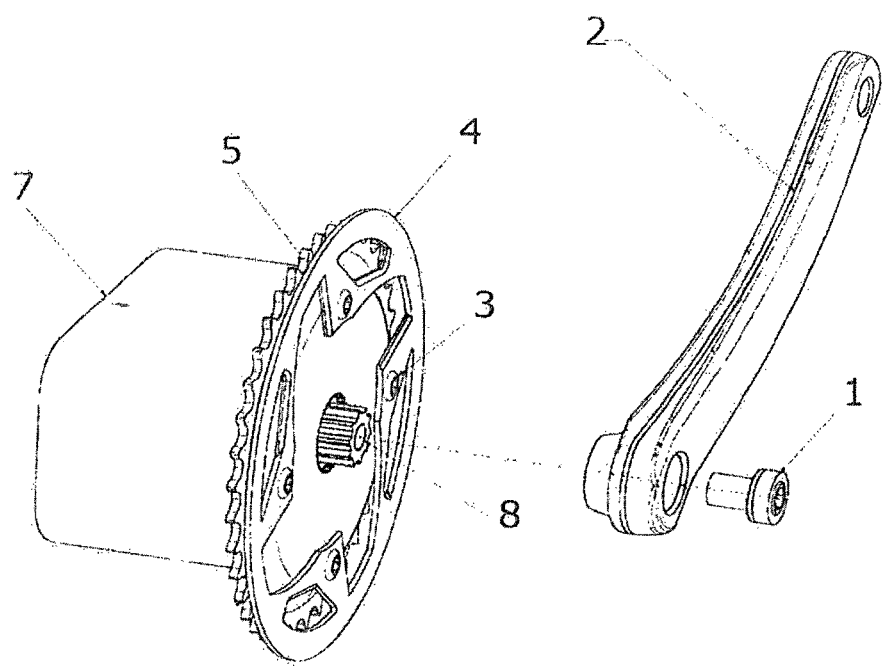
Figure 7:
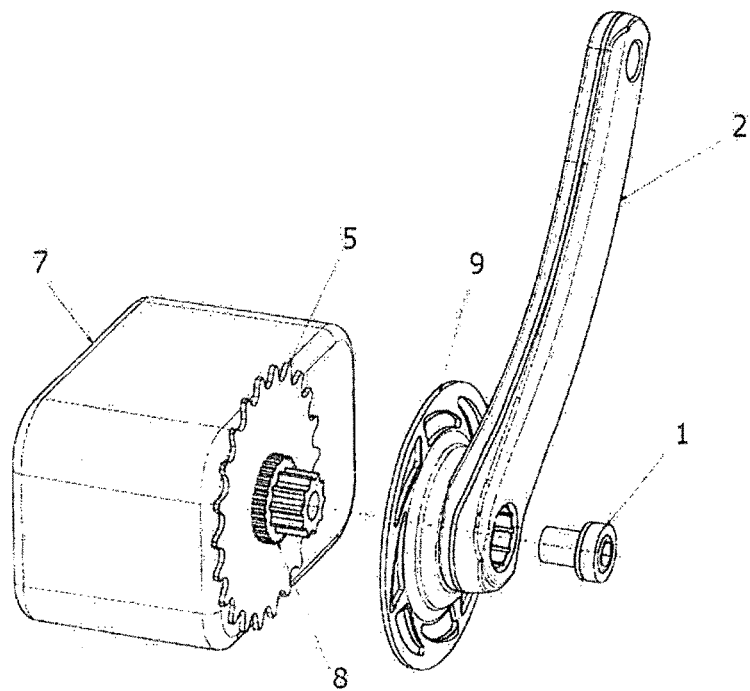
Figure 8:
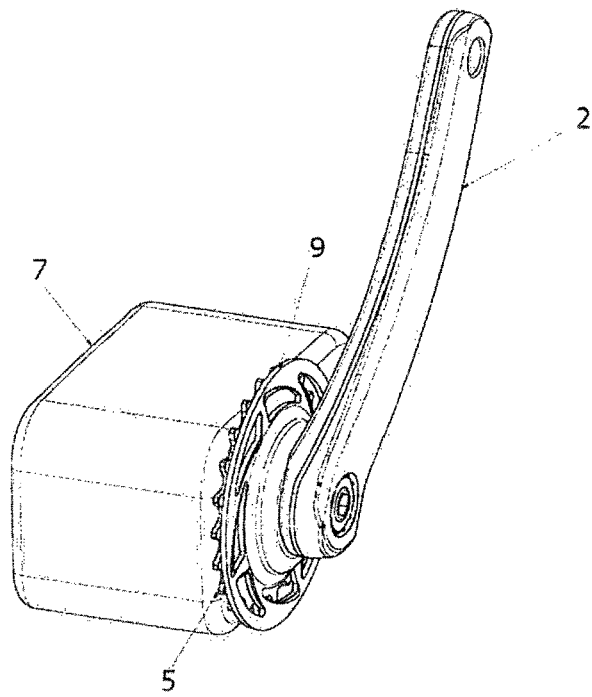
Figure 9:
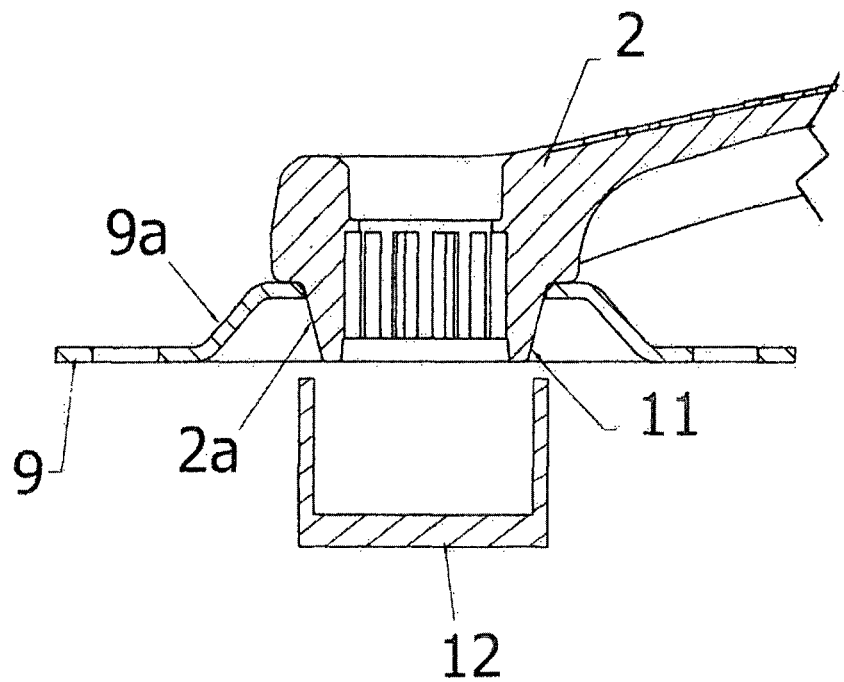
Figure 10:
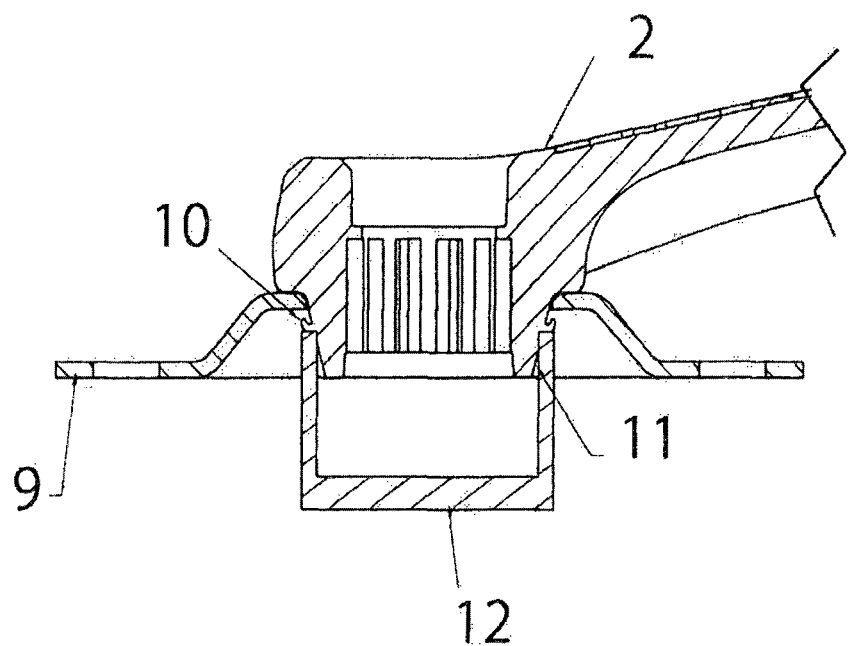

In the drawings, a chain wheel cover according to the prior art and the chain cover plate according to the invention are illustrated by way of example and simplified. In which:

FIGS. 1 and 2 a chain wheel cover according to the above mentioned state of the art for a bicycle with an electrical auxiliary drive FIGS. 3 to 8 a chain wheel cover according to the invention, and FIGS. 9 and 10 the production of a crimp connection for the chain wheel cover according to the FIGS. 3-8 in schematic simplification FIGS. 1 and 2 show an example of the drive motor of an electric bicycle, with the mounting of a multiperforated cover plate 4 on a sprocket 5 by means of screws 3 and nuts 6. After mounting the chain wheel 5 with cover 4 on the shaft pin 8 of an electric motor 7, a pedal crank 2 is defined by a central screw 1 with a spline mount shaft pin 8 of the provided electric motor 7.

Figure 3:
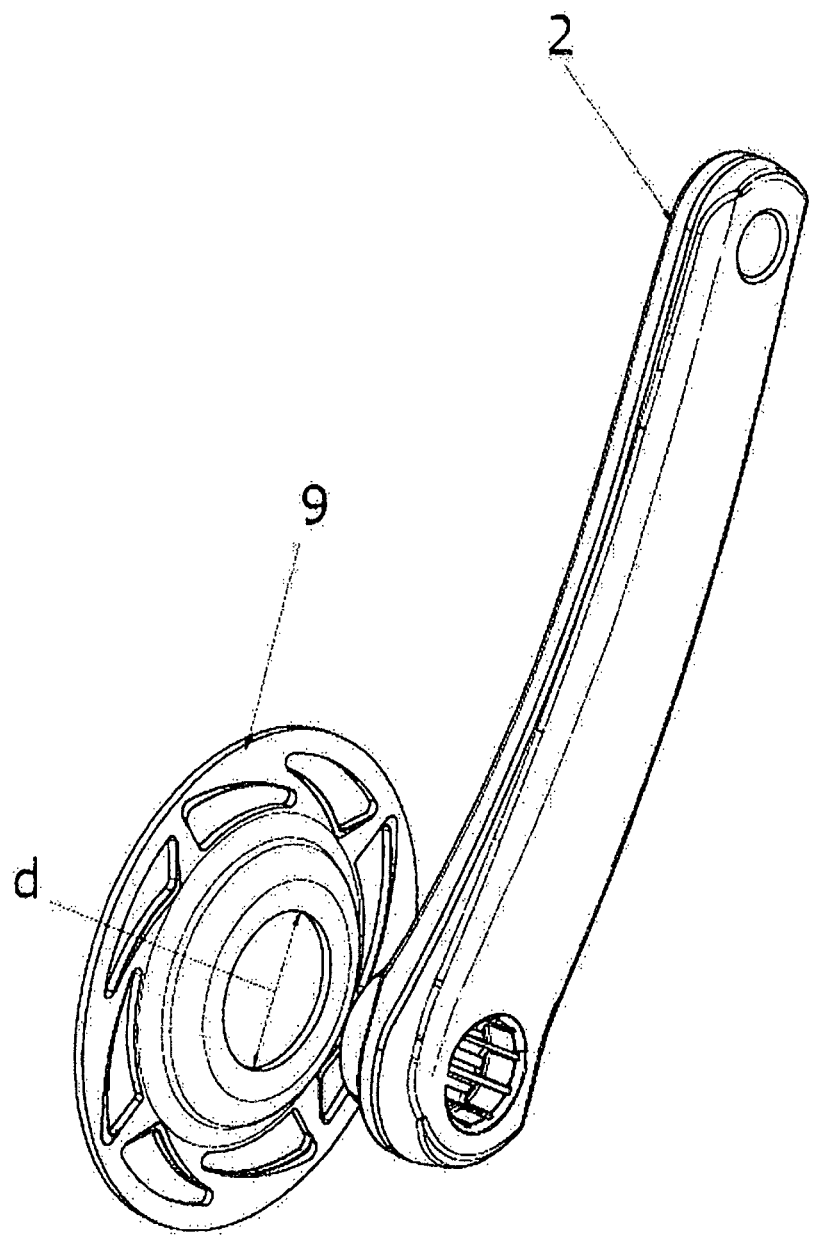
Figure 4:
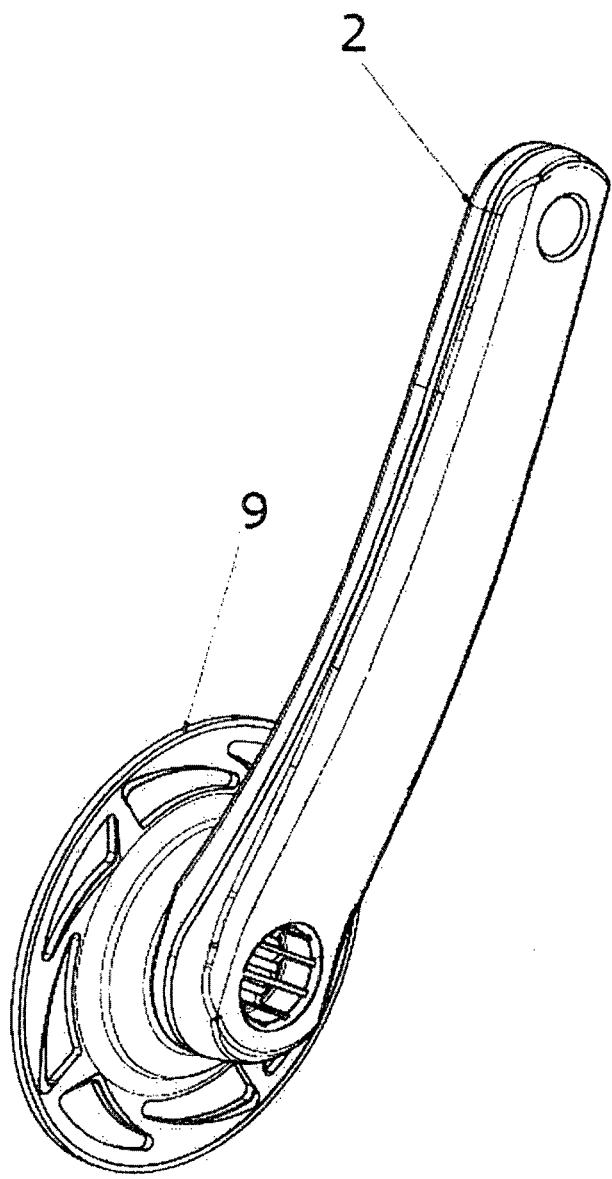

The same reference numerals for the same parts are used to illustrate the FIGS. 3 to 8 of the invention. FIGS. 3 and 4 show the pedal crank 2 before and after assembly, with a cover plate 9, the central opening having a diameter d in accordance with FIG. 3.

Figure 5:
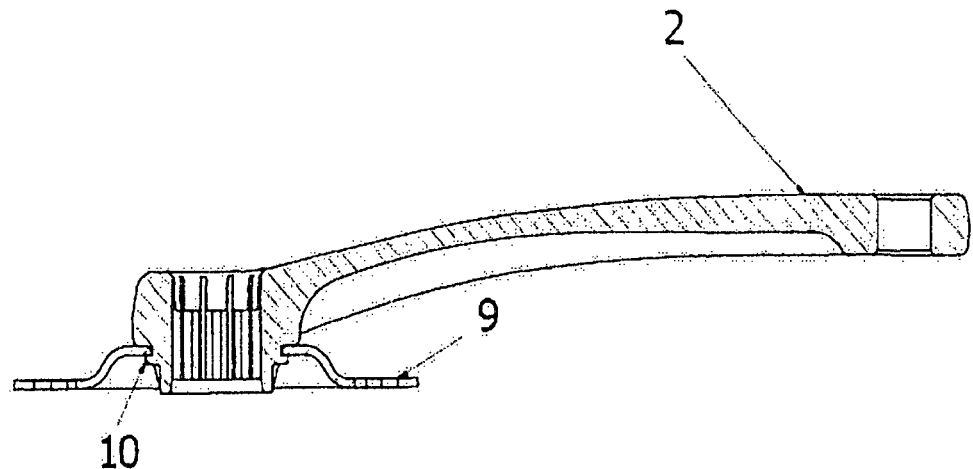

FIG. 5 shows a sectional representation of the crank 2 and the cover 9 The pedal crank 2 has an inner end with a bore for receiving the shaft journal, an electric motor or a pedal bearing shaft. The crank has at its inner end an annular extension or flange to which the cover plate 9 slide open, being torque resistant and inextricably linked. To this end, the annular extension of the crank 2 has an approximately conical outer profile annular extension against which an annular region around the central opening of the cover plate 9 is pressed by regions 10 with deformations of the material of the crank 2. To optimize, the cover plate 9 has an approximately plate shaped section (or a plateau shaped central region) at about the distance between the outer peripheral portion of the cover plate 9 and the chain wheel, not shown here.

Figure 6:
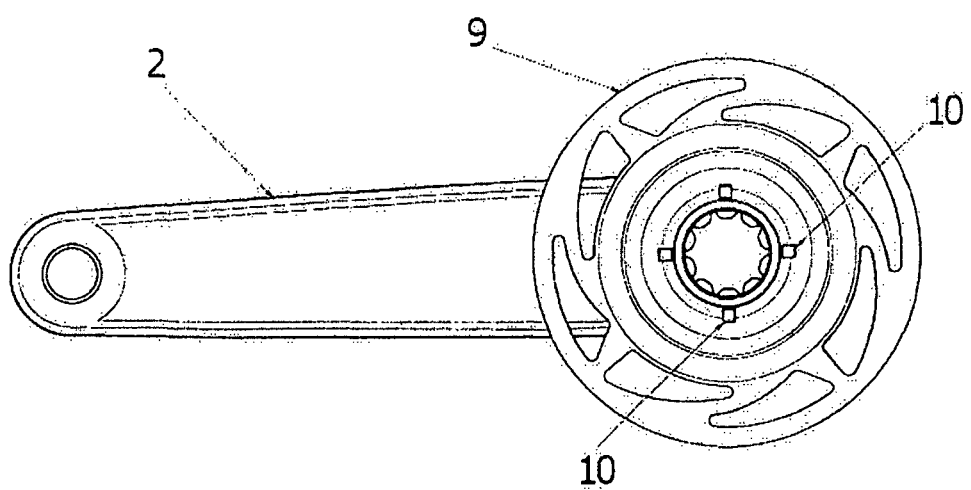

FIG. 6 shows the same arrangement as it is seen from the direction of the rear sprocket. The chain wheel 9 is connected to the annular extension of the crank 2 at four small areas 10 to which the material of the crank 2 is compressed. Depending on the materials of which the pedal crank 2 and the cover plate 9 are made, it is possible to crimp less than the four points shown or also circumferentially over the entire circumference of the central opening of the cover plate 9.

FIGS. 7 and 8 are substantially similar to FIGS. 1 and 2, showing the pedal crank 2 and the cover plate 9 integral with it before and after the mounting on the stub shaft 8 of the electric motor 7 with an assembled sprocket 5.

FIGS. 9 and 10 illustrate, in an enlarged view, the production of the pressed or crimped, between the pedal crank 2 and the cover 9 according to the top of FIG. 9, dish like cover plate 9, 9a pushed onto the annular conical approach 2a of the crank 2 until it rests against the annular extension and centered positioned by a pressing or swaging tool 12, which is formed here, in a simplified view, so that it generates upper narrow end faces by deformation of a portion of the material of the annular extension 11 at the crimp 10 between the pedal crank 2 and the cover plate 9.

The invention claimed is:

1. An electric motor assembly for a bicycle, comprising
an electric motor with a shaft journal,
a chain wheel on the shaft journal,
a pedal crank, and
a chain wheel cover plate provided between the chain wheel and the pedal crank and at least having a centre opening, wherein the cover plate is screwlessly and non-rotatably connected with said pedal crank at the side facing the chain wheel and forms an integral part with said pedal crank for mounting to the shaft journal of the electric motor.

2. The electric motor assembly according to claim 1, wherein an annular extension is formed on the pedal crank for receiving the shaft journal of the pedal bearing shaft end and the cover plate is inextricably linked with this annular extension.

3. The electric motor assembly according to claim 2, wherein the central opening of the cover plate has a diameter which is matched to the outer diameter of the annular extension of the pedal crank so that the cover plate is swaged on the annular extension of the pedal crank.

4. The electric motor assembly according to claim 2, wherein the covering plate in the region around its central opening is pressed to the annular extension of the pedal crank.

5. The electric motor assembly according to claim 1, wherein the cover plate is non-rotatably connected with the pedal crank, by at least partially deforming the material of the pedal crank.

6. The electric motor assembly according to claim 1, wherein the cover plate is like a recessed plate in the region of its connection with the pedal crank.

* * * * *